US008000244B1

(12) United States Patent
Canion et al.

(10) Patent No.: US 8,000,244 B1
(45) Date of Patent: Aug. 16, 2011

(54) SHARED RATE LIMITERS USING FLOATING BUCKETS

(75) Inventors: Rodney S. Canion, West Lake Hills, TX (US); Alexander I. Tomlinson, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 115 days.

(21) Appl. No.: 12/183,458

(22) Filed: Jul. 31, 2008

Related U.S. Application Data

(60) Provisional application No. 60/953,787, filed on Aug. 3, 2007.

(51) Int. Cl.
*H04L 12/26* (2006.01)

(52) U.S. Cl. ........................................................ 370/235

(58) Field of Classification Search ............... 370/230.1, 370/232, 235
See application file for complete search history.

(56) References Cited

U.S. PATENT DOCUMENTS

| | | | |
|---|---|---|---|
| 7,016,367 B1 * | 3/2006 | Dyckerhoff et al. | 370/429 |
| 7,397,762 B1 * | 7/2008 | Firoiu et al. | 370/230 |
| 2004/0042470 A1 * | 3/2004 | Cooper et al. | 370/401 |
| 2004/0230444 A1 * | 11/2004 | Holt et al. | 705/1 |
| 2006/0013182 A1 * | 1/2006 | Balasubramanian et al. | 370/343 |
| 2006/0233101 A1 * | 10/2006 | Luft et al. | 370/229 |
| 2007/0070895 A1 * | 3/2007 | Narvaez | 370/230 |
| 2007/0206501 A1 * | 9/2007 | Alesi et al. | 370/235 |
| 2008/0201772 A1 * | 8/2008 | Mondaeev et al. | 726/13 |
| 2008/0298243 A1 * | 12/2008 | Martinotti et al. | 370/235 |
| 2010/0271940 A1 * | 10/2010 | Padwekar | 370/230 |

* cited by examiner

*Primary Examiner* — Kevin C Harper

(57) ABSTRACT

Traffic flow rate limits are enforced in an Intrusion Prevention System (IPS) having a plurality of deep packet inspection (DPI) engines by using a floating token bucket scheme. The IPS includes a plurality of rate limiters which are associated with different classes (e.g., protocols) of traffic. A floating token bucket is associated with each rate limiter. The token bucket associated with a rate limiter is passed from DPI engine to DPI engine. Only the DPI engine currently in possession of the token bucket for a particular rate limiter is allowed to process traffic of the class associated with that rate limiter. A DPI engine is only allowed to process traffic associated with a token bucket in its possession if that token bucket is not empty. Use of such floating token buckets enforces rate limits for each traffic class across the multiple DPI engine.

14 Claims, 6 Drawing Sheets

SHARED RATE LIMITERS USING FLOATING BUCKETS

RELATED APPLICATION

This application claims the benefit of U.S. Provisional Application No. 60/953,787 entitled "Shared Rate Limiters Using Floating Buckets" filed Aug. 3, 2008, by Canion, et al.

BACKGROUND

As the use of digital electronic communication networks has grown in recent years, the sophistication of internal and external network attacks in the form of viruses, Trojan horses, worms, and malware of various kinds has increased dramatically. Just as dramatic is the accelerated increase of network speeds and a corresponding drop in network costs, thereby driving the rapid adoption of networks. These and other factors have necessitated the development of innovative and more advanced network security measures.

For example, Intrusion Detection Systems (IDS) can often detect network attacks, but as passive systems they generally offer little more than after-the-fact notification. In contrast, Intrusion Prevention Systems (IPS) have been developed to complement traditional security products, such as firewalls, by proactively analyzing network traffic flows and active connections while scanning incoming and outgoing requests. As network traffic passes through the IPS, it is examined for malicious packets. Such examination may be performed by one or more "deep packet inspection engines" which perform "deep packet inspection" on some or all of the packets in the network traffic. Traffic is blocked if the IPS identifies it as posing a potential threat or as being associated with an unwanted application, while legitimate traffic is allowed to pass through the system unimpeded.

Properly implemented, an IPS can be an effective network security safeguard. There are, however, needs for improved IPS capabilities. For example, an IPS may include multiple deep packet inspection engines for performing deep packet inspection on traffic flows passing through the IPS because a single deep packet inspection engine, typically implemented as a microprocessor executing a suitable operating system and software, may not be capable of processing the flows at a sufficiently high throughput. Techniques for balancing network traffic load among multiple deep packet inspection engines in an IPS to increase the aggregate performance of such engines and thereby the overall performance of the IPS are disclosed in U.S. patent application Ser. No. 11/443,490, filed by Brian C. Smith, Alexander Sarin, and Hazem M. Kadaba on May 30, 2006, entitled "Intrusion Prevention System Edge Controller"; and U.S. patent application Ser. No. 11/782,840, filed by Gerald S. Stellenberg, Brian C. Smith, and James M. Rollette on Jul. 25, 2007, entitled "System and Method for Traffic Load Balancing to Manage Muliple Processors".

When using multiple deep packet inspection engines, where each engine is assigned multiple communication sessions and where traffic shaping is configured to pace the traffic of a specified protocol type (e.g., HTTP traffic), and that controlled traffic is spread across the multiple engines, there is a need to coordinate the output of the multiple engines, such that the aggregate rate of the output from the multiple engines for each protocol type is limited to the specified allowed rate for that protocol type. In other words, it is desirable to enforce a system wide rate limit for traffic of a particular protocol type even when traffic of that protocol type is spread across multiple engines.

What is needed, therefore, are techniques for managing traffic flow processing in an IPS or other network device to distribute available bandwidth among traffic flows.

SUMMARY

Traffic flow rate limits are enforced in an Intrusion Prevention System (IPS) having a plurality of deep packet inspection (DPI) engines by using a floating token bucket scheme. The IPS includes a plurality of rate limiters which are associated with different classes (e.g., protocols) of traffic. A floating token bucket is associated with each rate limiter. The token bucket associated with a rate limiter is passed from DPI engine to DPI engine. Only the DPI engine currently in possession of the token bucket for a particular rate limiter is allowed to process traffic of the class associated with that rate limiter. A DPI engine is only allowed to process traffic associated with a token bucket in its possession if that token bucket is not empty. Use of such floating token buckets enforces rate limits for each traffic class across the multiple DPI engines.

For example, one embodiment of the present invention is directed to a system comprising a first rate limiter associated with a first maximum processing rate associated with a first traffic flow of a first traffic class; a plurality of packet processors comprising means for processing the first traffic flow; and first rate limiting means for limiting a first aggregate rate of processing of the first traffic flow by the plurality of packet processors to the first maximum processing rate.

The plurality of packet processors may further include means for processing a second traffic flow, and the system may further include: a second rate limiter associated with a second maximum processing rate for the second traffic flow; and second rate limiting means for limiting a second aggregate rate of processing of the second traffic flow by the plurality of packet processors to the second maximum processing rate.

The first traffic flow may be one of a first plurality of traffic flows of the first traffic class. The means for processing the first traffic flow may include means for processing the first plurality of traffic flows. The first rate limiting means may include means for limiting a first aggregate rate of processing of the first plurality of traffic flows by the plurality of packet processors to the first maximum processing rate.

The first plurality of processors may include a first plurality of deep packet inspection engines including means for performing deep packet inspection on the first traffic flow.

The first rate limiting means may include: a token bucket associated with the first traffic class, the token bucket being associated with a current number of tokens, a refill rate, and a maximum number of tokens; means for refilling the token bucket with tokens at the refill rate; means for limiting the current number of tokens to the maximum number of tokens; means for allocating the token bucket to a first one of the plurality of packet processors; means for prohibiting the first one of the plurality of packet processors from processing a first amount of traffic corresponding to more than the current number of tokens in the token bucket; and means for removing a first number of tokens from the token bucket proportional to the first amount of traffic processed by the first one of the plurality of packet processors. The system may further include means for allocating the token bucket to a second one of the plurality of packet processors; means for prohibiting the second one of the plurality of packet processors from processing a second amount of traffic corresponding to more than the current number of tokens in the token bucket; and means for removing a second number of tokens from the token bucket proportional to the second amount of traffic processed by the second one of the plurality of packet processors.

Other features and advantages of various aspects and embodiments of the present invention will become apparent from the following description and from the claims.

DETAILED DESCRIPTION

Figure 1A:
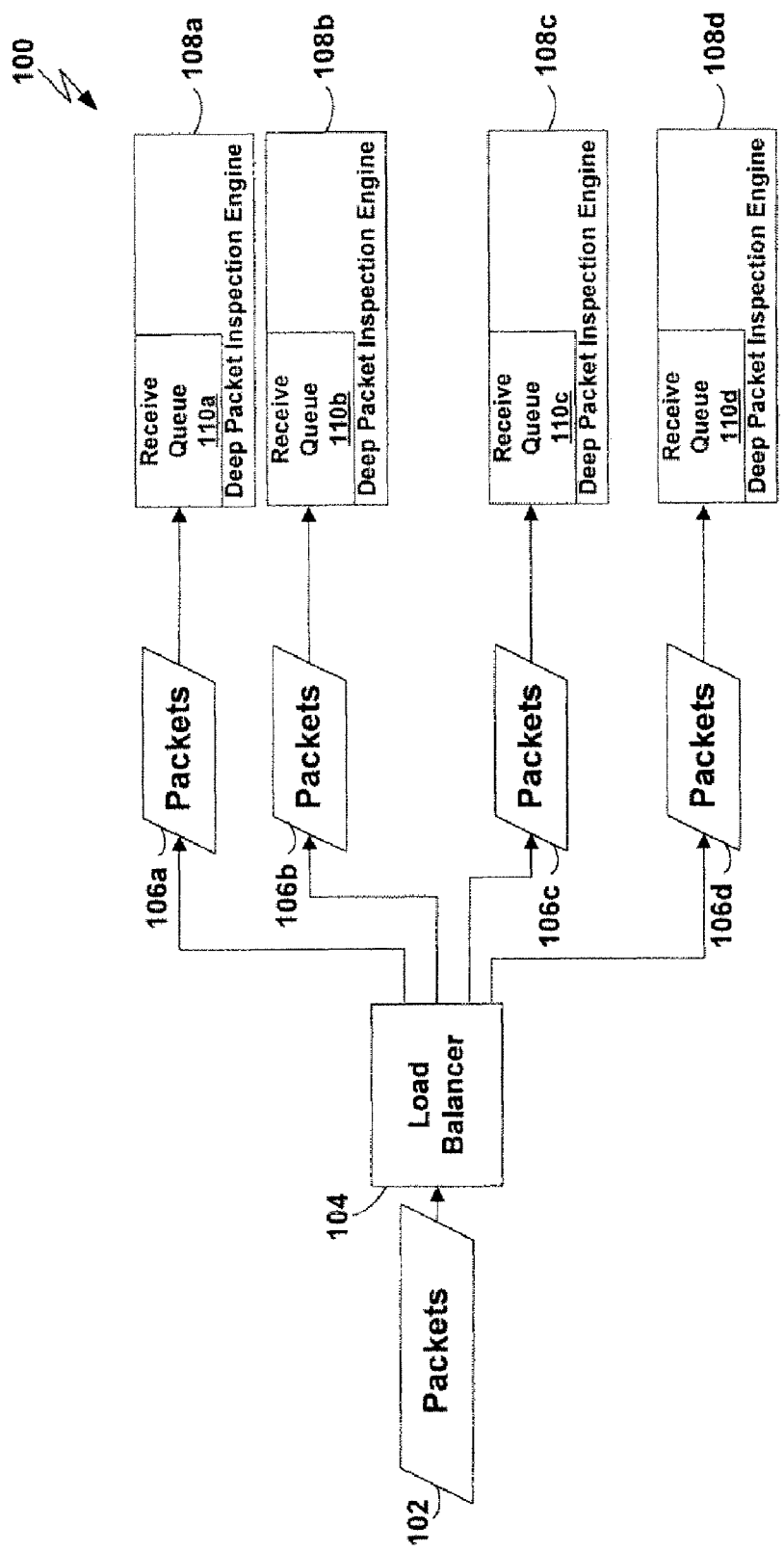
FIG. 1A is a block diagram of a load-balanced network Intrusion Prevent System (IPS) according to one embodiment of the present invention.
Figure 2A:
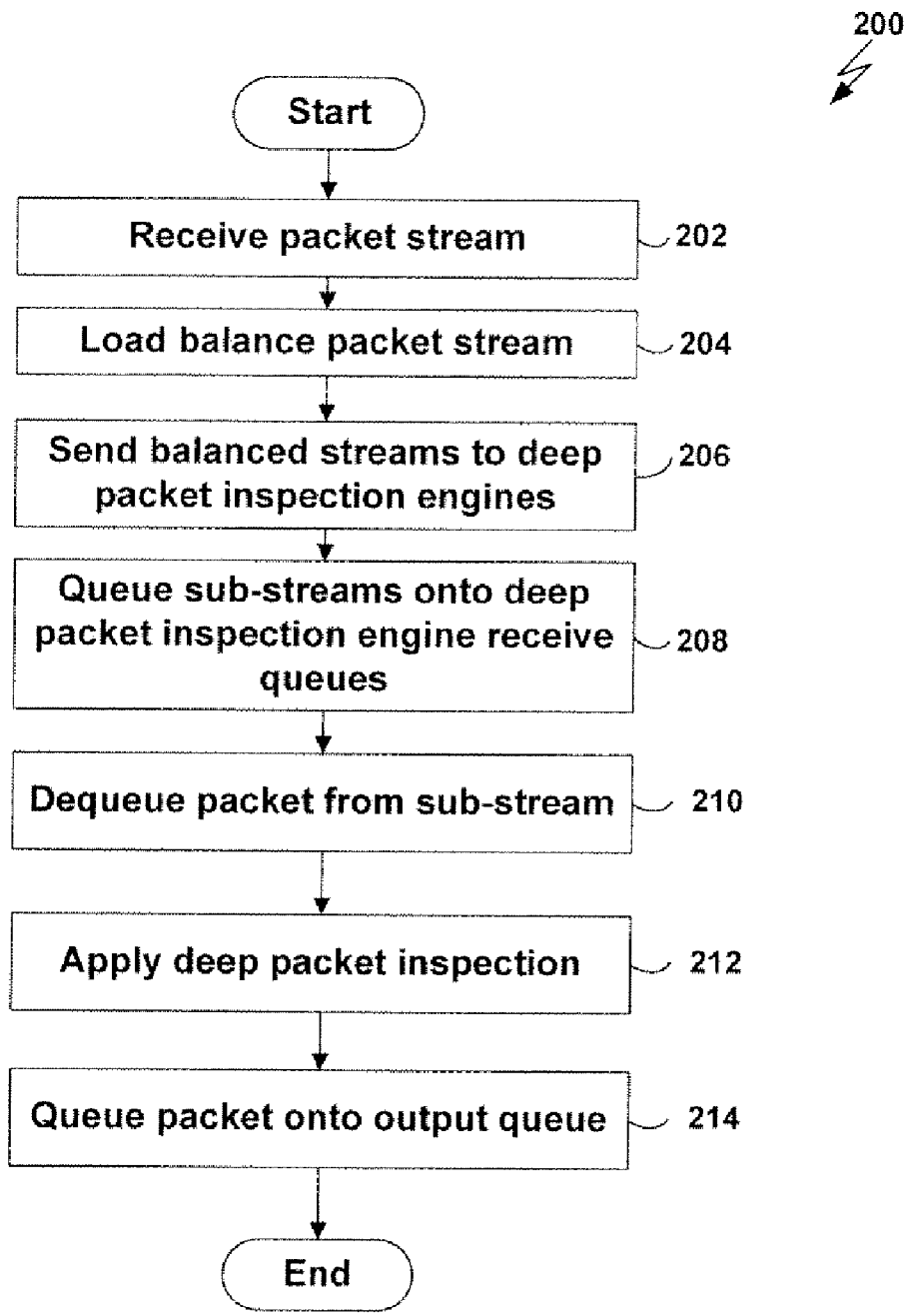
FIG. 2A is a flowchart of a method performed by the IPS to perform the operations illustrated in FIG. 1A according to one embodiment of the present invention.

Referring to FIG. 1A, a block diagram is shown of a network Intrusion Prevention System (IPS) 100 according to one embodiment of the present invention. Referring to FIG. 2A, a flowchart is shown of a method 200 performed by the system 100 of FIG. 1A according to one embodiment of the present invention.

A stream of packets 102 enters a load balancer 104 (step 202), which divides the stream of packets 102 into four sub-streams 106a-d (step 204), which the load balancer 104 sends to deep packet inspection engines 108a-d, respectively (step 206). Examples of techniques that may be used to implement the load balancer 104 may be found in U.S. patent applications Ser. Nos. 11/443,490 and 11/782,840. Although four sub-streams 106a-d are shown in FIG. 1A for purposes of example, the load balancer 104 may balance the incoming packet stream 102 onto any number of sub-streams.

Deep packet inspection engines 108a-d include receive queues 110a-d, respectively. The deep packet inspection engines 108a-d receive the packet sub-streams 106a-d and queue the packets in the sub-streams 106a-d onto the receive queues 110a-d, respectively (step 208). The receive queues 110a may, for example, be first-in first-out (FIFO) queues, according to which the packets in the sub-streams 106a-d are processed by the corresponding deep packet inspection engines 108a-d in the order in which the packets in the sub-streams 106a-d are received by the deep packet inspection engines 108a-d.

The deep packet inspection engines 108a-d may process their receive queues 110a-d in any manner. For example, referring to FIG. 1C, deep packet inspection engine 108a may include a receive queue interface 170 which dequeues packets sequentially from the receive queue 110a (step 210) and applies deep packet inspection to them, thereby producing an internal stream of inspected packets 172 (step 212), which are queued onto an output queue 174 (step 214). The inspected packets 172 may not include all of the packets 106a received by the deep packet inspection engine 108a since, for example, the receive queue interface 170 may drop packets which fail deep packet inspection.

As mentioned above, it is desirable to apply rate limiting to traffic that passes through a network device such as the IPS 100 to ensure that no individual traffic flow dominates the resources of the device. For example, the packet stream 102 received by the IPS 100 may include thousands of flows which the IPS 100 must process simultaneously. Since multiple flows may carry the same traffic class and these flows carring the same traffic may be divided among multiple deep packet inspection engines 108a-d, there is a need to coordinate the output of the multiple engines 108a-d if per-traffic class rate limits are to be enforced across the IPS 100 as a whole. In other words, there must be some cross-engine mechanism for limiting the rates of traffic of different classes since traffic in any class may be spread among multiple engines 108a-d.

In general, embodiments of the present invention use rate limiters to distribute the network traffic load. A floating token bucket is associated with each rate limiter. The token buckets are "floating" in the sense that they are floated (passed) from one deep packet inspection engine to another. When a deep packet inspection engine is in possession of a bucket for a particular rate limiter, corresponding to a particular class of traffic, that deep packet inspection engine may transmit traffic of that class by removing a number of tokens from the bucket corresponding to the amount of traffic to be transmitted. The deep packet inspection engine may only transmit traffic of a particular class when it is in possession of the corresponding bucket and when that bucket contains a sufficient number of tokens.

The token buckets are passed from deep packet inspection engine to deep packet inspection engine in a round-robin fashion. Tokens are added back to the token buckets periodically.

Token buckets may be floated from one deep packet inspection engine to another in any of a variety of ways. For example, deep packet inspection engines may pass the token buckets to each other by passing messages to each other. As another example, a global interface may manage the state of the rate limiters, and associated token buckets, and transmit the token buckets from one deep packet inspection engine to another.

Figure 1B:
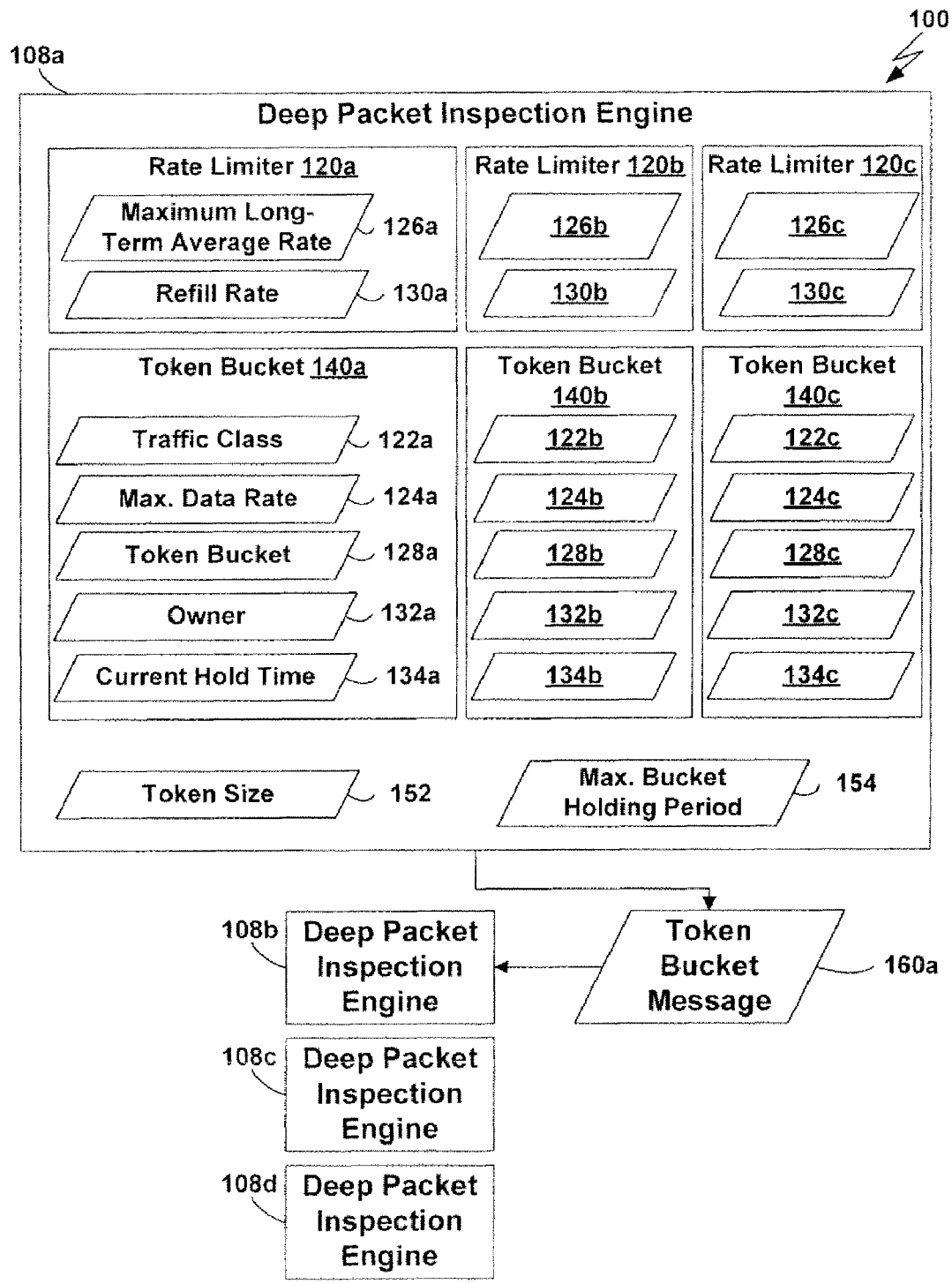
FIG. 1B is a block diagram showing the IPS of FIG. 1A in more detail according to one embodiment of the present invention.

For example, referring to FIG. 1B, the IPS 100 is shown in more detail according to one embodiment of the present invention. In the embodiment of the IPS shown in FIG. 1B, deep packet inspection engine 108a has been designated as the "token master" deep packet inspection engine. As a result, deep packet inspection engine 108a stores certain state of a plurality of rate limiters 120a-c. Although three rate limiters 120a-c are shown in FIG. 1B, the IPS 100 may include any number of rate limiters. The number and type of rate limiters may be static or dynamic.

Rate limiters 120a-c correspond to token buckets 140a-c, respectively. Initially, token buckets 140a-c may be contained within deep packet inspection engine 108a. As will be described in more detail below, however, token buckets 140a-c may be passed (floated) in a round-robin fashion among the deep packet inspection engines 108a-d using message passing.

Each of the rate limiters 120a-c, and corresponding token buckets 140a-c, applies to a subset of the incoming packets 102. For example, rate limiters 120a-c may be associated with, and be applied to, packets of a particular protocol or application type. For example, rate limiter 120a may be associated with HTTP flows, rate limiter 120*b* may be associated with FTP flows, and rate limiter 120*c* may be associated with SMTP flows.

The rate limiters 120*a-c* and token buckets 140*a-c* may, for example, be implemented as data structures tangibly stored in any kind of computer-readable memory. In the embodiment illustrated in FIG. 1B, the token buckets 140*a-c* include fields 122*a-c* which specify the type(s) of flows to which the rate limiters 120*a-c* and token buckets 140*a-c* apply. For example, field 122*a* may specify that rate limiter 120*a* and token bucket 140*a* apply to HTTP flows. The class of traffic to which a particular rate limiter applies may, however, be specified in other ways.

Each of the rate limiters 120*a-c* and token buckets 140*a-c* is also associated with a corresponding maximum burst rate. For example, token buckets 140*a-c* include fields 124*a-c* which specify the maximum burst rates associated with the flows to which rate limiters 120*a-c* and token buckets 140*a-c* apply, respectively. For example, since rate limiter 120*a* applies to HTTP flows in the present example, the value of maximum burst rate field 124*a* specifies the maximum short-term (burst) data rate of HTTP flows through the IPS 100. Maximum burst rates 124*a-c* may be the same as or differ from each other. The maximum burst rate associated with a particular rate limiter may be defined, for example, in terms of an absolute maximum bandwidth (e.g., 1 Mbps), in terms of a percentage of the total bandwidth of the IPS 100 (e.g., 1%), or in terms of a maximum number of tokens.

In the example illustrated in FIGS. 1A and 1B, the rate limiters 120*a-c* are global to the IPS 100. In other words, rate limiter 120*a* applies to all HTTP traffic through the IPS 100, even though such traffic may be found in multiple flows and balanced (divided) among multiple deep packet inspection engines 108*a-d*. The states of the rate limiters 120*a-c* and token buckets 140*a-c* (such as the traffic classes 122*a-c* and maximum data rates 124*a-c* described above) may therefore apply across all of the deep packet inspection engines 108*a-d*, as will be described in more detail below.

In accordance with the token bucket algorithm used by the IPS, the rate limiters 120*a-c* have corresponding maximum long-term average data rates 126*a-c*, respectively. For example, rate limiter 120*a* has maximum long-term average data rate 126*a* and rate limiter 120*b* has maximum long-term average data rate 126*b*. The maximum long-term average data rates 126*a-b* may be the same as or differ from each other.

The token buckets 140*a-c* include fields 128*a-c*, respectively, for storing the current numbers of tokens in the buckets 140*a-c*. For example, field 128*a* may contain a value representing the number of tokens currently stored within the token bucket for rate limiter 120*a*. Upon initialization of the IPS 100, the token master engine 108*a* may initialize counter fields 128*a-c* to be "full," i.e., to include the numbers of tokens corresponding to the maximum long-term data rates 126*a-c* for their respective rate limiters 120*a-c*.

In the embodiment illustrated in FIG. 1B, each token corresponds to a fixed number of bits indicated by a token size 152 stored by the token master engine 108*a*. In other words, the token size 152 is common to all of the rate limiters 120*a-c*. The maximum number of tokens allocated to a particular rate limiter, multiplied by the token size, determines the maximum burst size of traffic associated with the rate limiter Rate limiters 120*a-c* also have refill rates 130*a-c*, respectively. Refill rates 130*a-c* indicate the rates at which the token buckets 140*a-c* associated with rate limiters 120*a-c*, respectively, are refilled with tokens after they are removed from the bucket. For example, the refill rate 130*a* of rate limiter 120*a* indicates the rate at which the token bucket 140*a* is refilled with tokens after they are removed from the bucket 140*a*. The refill rate associated with a particular rate limiter defines the maximum data rate of the class of traffic associated with that rate limiter. For example, the refill rate 130*a* associated with rate limiter 120*a* defines the maximum data rate of the (HTTP) traffic associated with rate limiter 120*a*. Refill rates 130*a-c* may be the same as or differ from each other.

Figure 1C:
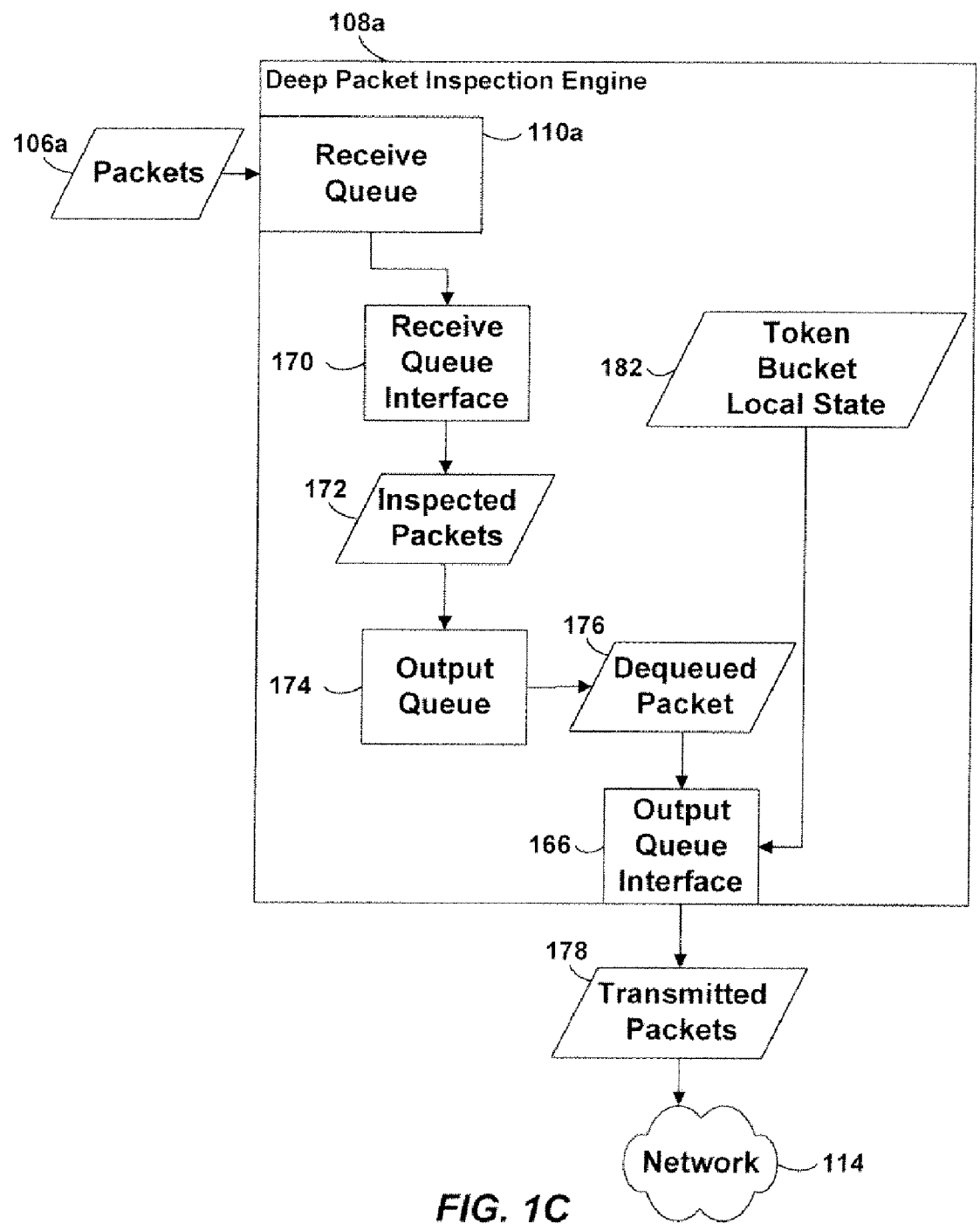
FIG. 1C is a block diagram illustrating operations performed by a deep packet inspection engine to process its output queue according to one embodiment of the present invention.

Recall from FIG. 1C that the deep packet inspection engine 108*a* queues packets 162 onto output queue 174. The other deep packet inspection engines 108*b-d* may similarly queue their own inspected packets (not shown) onto their own output queues (not shown).

In general, in embodiments of the present invention, deep packet inspection engines 108*a-d* do not immediately transmit packets from their output queues over the network 114. Instead, the token bucket for each of the rate limiters 120*a-c* is passed from deep packet inspection engine to deep packet inspection engine in a round-robin fashion. Each deep packet inspection engine can only transmit packets of a particular class from its output queue while that deep packet inspection engine is in possession of the token bucket corresponding to that class of traffic.

Figure 2B:
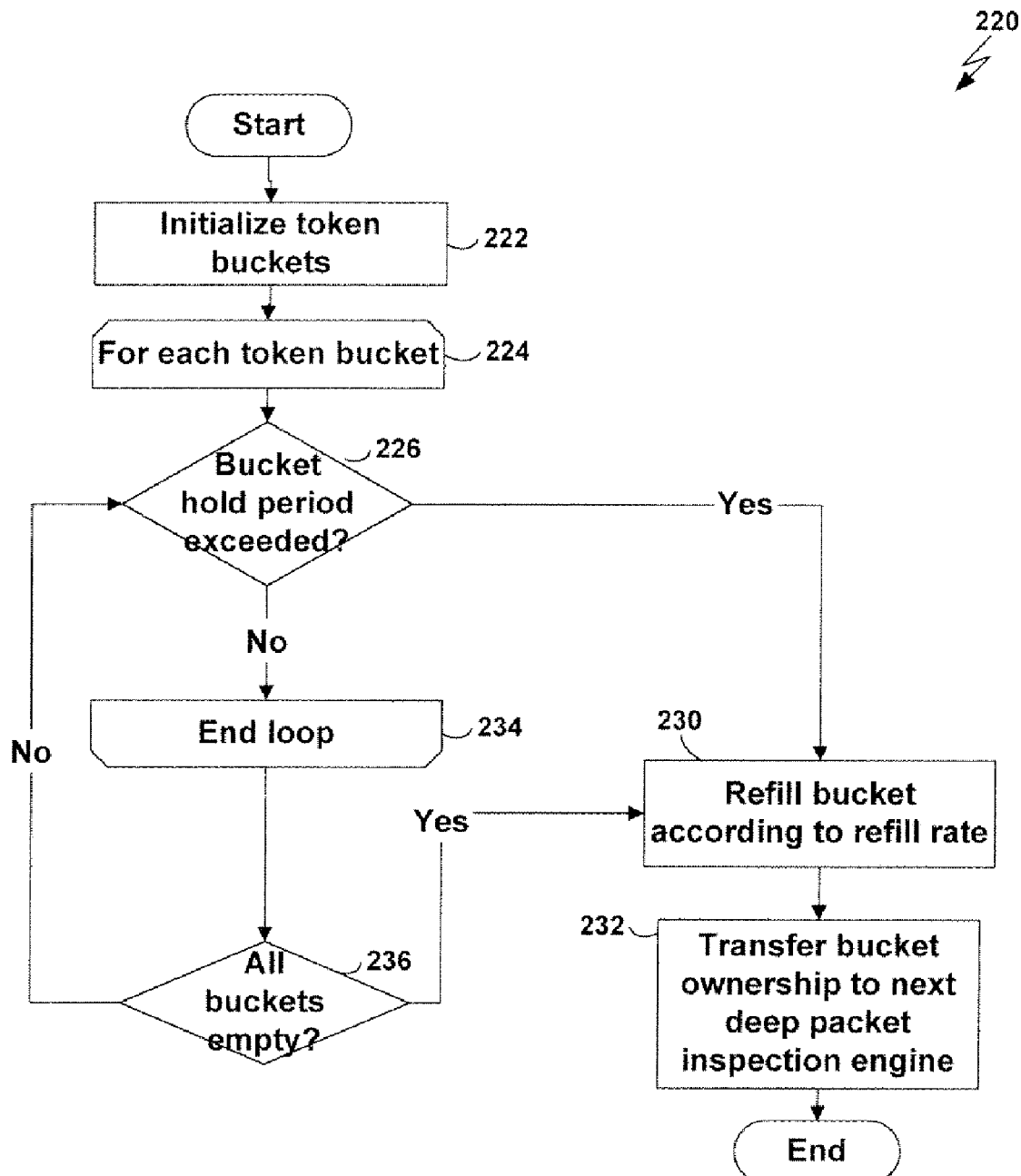
FIG. 2B is a flowchart of a method performed by the token master of FIG. 1B to manage the state of rate limiters according to one embodiment of the present invention.

For example, referring to FIG. 2B, a flowchart is shown of a method 220 that is performed by the IPS 100 of FIG. 1B to float the token buckets 140*a-c* of rate limiters 120*a-c* among the deep packet inspection engines 108*a-d* according to one embodiment of the present invention.

At any point in time, each of the token buckets 140*a-c* is "owned" by (i.e., allocated to) at most one of the deep packet inspection engines 108*a-d*. The token buckets 140*a-c* may be floated among the deep packet inspection engines 108*a-d* independently of each other. An embodiment will now be described, however, in which all of the token buckets 140*a-c* are floated among the deep packet inspection engines 108*a-d* as a group. In other words, at any point in time, a single one of the deep packet inspection engines 108*a-d* is in possession of all of the token buckets 140*a-c* in the embodiment that will now be described.

When the IPS 100 is initialized the token master deep packet inspection engine 108*a* initializes the token buckets 140*a-c* by, for example, initializing the numbers of tokens 128*a-c* in the token buckets 140*a-c* to correspond to the maximum long-term data rates 126*a-c*, respectively (FIG. 2A, step 222). As mentioned above, all of the token buckets 140*a-c* may initially be owned by the token master deep packet inspection engine 108*a*.

The deep packet inspection engine currently in possession of the token buckets enters a loop over all of the token buckets 140*a-c* (step 224). The variable T will be used herein to refer to the token bucket that is the object of the current iteration of the loop initiated in step 224.

The token master 108*a* imposes a maximum holding period on the token buckets 140*a-c*. In the embodiment illustrated in FIG. 1B, the token master 108*a* stores a maximum token bucket holding period 154 that is applied to all of the token buckets 140*a-c*. The holding period 154 may, for example, be defined in terms of a maximum amount of time or a maximum number of tokens. In either case, each of the deep packet inspection engines 108*a-d* is allowed to have ownership of the token buckets 140*a-c* for no more than the bucket holding period 154 before transferring ownership of the token buckets 140*a-c* to the next deep packet inspection engine.

Once the maximum holding period has been exceeded (step 226), the current deep packet inspection engine may refill the token buckets 140*a-c* with tokens according to their respective refill rates 130*a-c*. For example, if the refill rate 130*a* of token bucket 140*a* is N, and there are M deep packet inspection engines, then token bucket 140*a* may be refilled with NIM tokens each time the token bucket 140*a* is transferred, thereby refilling it with a total of N tokens for each full pass through all deep packet inspection engines 108*a-d*. Alternatively, for example, token bucket 140*a* may be refilled with N tokens by the token master 108*a* each time it is transferred to the token master 108*a* (i.e., once every full pass through the engines 108*a-d*).

If the resulting total number of tokens 128*a* in the token bucket 140*a-c* would cause the token bucket 140*a* to exceed the corresponding rate limiter's maximum long-term average data rate 126*a*, then the current number of tokens 128*a* may be reduced to a number sufficiently low that traffic transmitted using the token bucket 128*a* will not exceed the maximum long-term average data rate 126*a*.

The token buckets 140*a-c* may be transferred to the next deep packet inspection engine (step 232). This transference may be performed, for example, by message passing. For example, referring to FIG. 1B, deep packet inspection engine 108*a* transfers token bucket 140*a* to deep packet inspection engine 108*b* by passing a message 160*a* to deep packet inspection engine 108*b*. The message 160*a* may include all of the state of the token buckets 140*a-c*, i.e., the traffic classes 122*a-c*, maximum burst rates 124*a*, current numbers of tokens 128*a-c*, and current hold times 134*a-c*, although the hold times 134*a-c* may be reset to zero before or after transmission of the message 160*a*. Message 160*a*, and other messages (not shown) between deep packet inspection engines 108*a-d* may be passed using memory mailboxes or other low-latency techniques that are not resource-intensive.

Note that the "next" deep packet inspection engine may be selected in step 232 in any manner. For example, deep packet inspection engines 108*a-d* may be configured with a predetermined sequence in which to float the token buckets 140*a-c*, such as the sequence shown in FIG. 1A. When the next deep packet inspection engine receives the token buckets 140*a-c*, it may perform the method 220 shown in FIG. 2B.

The maximum bucket holding period 154 may be enforced in any of a variety of ways. For example, the maximum holding period 154 may be stored not only in the token master 108*a*, but in all of the deep packet inspection engines 108*a-d*, in which case each of the engines 108*a-d* may enforce the holding period 154 on itself by transferring the token buckets 140*a-c* to the next deep packet inspection engine in line (step 232) if it detects that the current holds times 134*a-c* exceed the bucket holding period 154 (step 226). Alternatively, for example, the token master 108*a* may enforce the maximum holding period 154 by keeping track of the current hold times 134*a-c* and transmitting a message to the current owner of the token buckets 140*a-c* when it becomes time to relinquish possession of the token buckets 140*a-c*. The current hold times 134*a-c* may be initialized to zero in step 222 and again each time possession of the token buckets 140*a-c* is transferred in step 232.

If the maximum bucket holding period 154 is defined as a time, then the counters 134*a-c* may, for example, be updated every microsecond. If the maximum bucket holding period 154 is defined as a number of tokens, then the current holds times 134*a-c* may be updated each time tokens are removed from the corresponding token buckets 140*a-c* by an amount equal or proportional to the number of tokens removed. For example, if deep packet inspection engine 108*a* owns token bucket 140*a* and removes four tokens from token bucket 140*a*, then the value of counter 134*a* may be increased by four.

If the maximum bucket holding period 154 has not been exceeded by the deep packet inspection engine currently in possession of the token buckets 140*a-c*, then the current deep packet inspection engine turns to the next token bucket (step 234).

Once the current deep packet inspection engine has cycled through all of the token buckets 140*a-c*, the current deep packet inspection engine 108*a-d* may determine whether all of the token buckets 140*a-c* are empty (step 236). If so, the current deep packet inspection engine may proceed to step 230 and refill and transfer the token buckets 140*a-c* to the next deep packet inspection engine in line, even though the maximum holding period 154 has not been exceeded. Otherwise, the current deep packet inspection engine may return to step 224 and repeat the steps described above, until either the maximum bucket holding period 154 has been exceeded (step 226) or all of the token buckets 140*a-c* are empty (step 236).

Figure 2C:
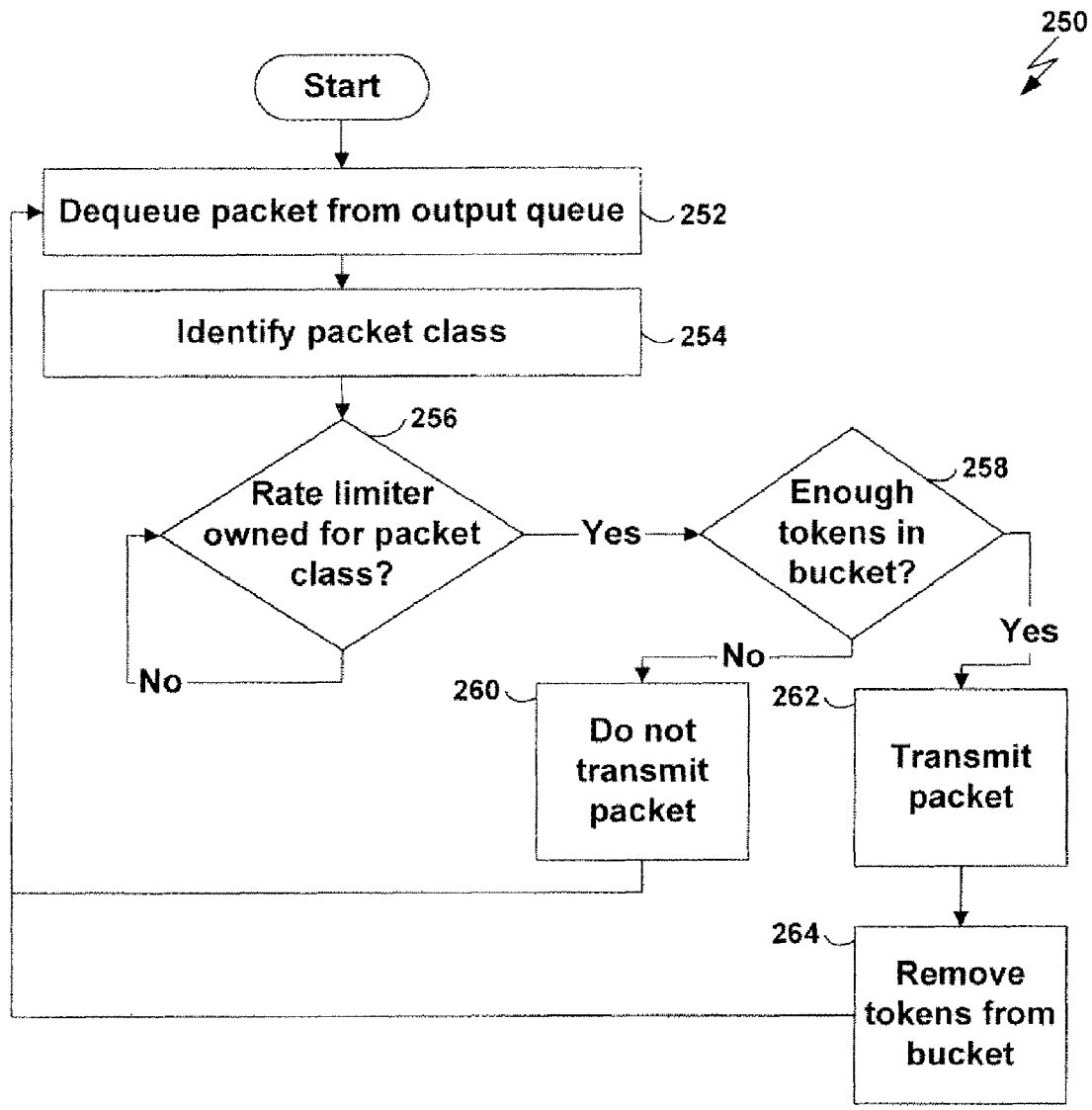
FIG. 2C is a flowchart of a method performed by a deep packet engine to process its output queue according to one embodiment of the present invention.

As described above, the deep packet inspection engines 108*a-d* queue their output in output queues, such as output queue 174 in deep packet inspection engine 108*a* (FIG. 1C). Referring to FIG. 2C, a flowchart is shown of a method 250 performed by the deep packet inspection engine 108*a* to transmit packets from its output queue 174 according to one embodiment of the present invention. The other deep packet inspection engines 108*a-d* may use the same or similar techniques to transmit packets from their output queues. The method 250 shown in FIG. 2C may be performed in parallel with the method 220 shown in FIG. 2B.

The deep packet inspection engine 108*a* may dequeue the next packet 176 from its output queue 174 (step 252). The deep packet inspection engine 108*a* identifies a class of the packet 176 (step 254). Examples of packet classes include the protocol and application of the packet 176. The packet class may be identified in any of a variety of ways. For example, the load balancer 104 may identify the class of the packet 176 and notify the deep packet inspection engine 108*a* of the identified class. Alternatively, for example, the deep packet inspection engine 108*a* may identify the packet's class directly, such as by examining a header of the packet 176, or by identifying a session (flow) of which the packet 176 is a member, and identifying the class of the session. For example, when the IPS 100 receives the first packet in a new session, the IPS 100 may identify the class of the session and store an identifier of that class in a form that is accessible to the deep packet inspection engine 108*a*, thereby eliminating the need to identify the class of subsequent individual packets in the same session.

The deep packet inspection engine 108*a* determines whether it currently owns a token bucket associated with the class of the packet 176 (step 256). The deep packet inspection engine 108*a* may make this determination by, for example, examining the traffic class fields 122*a-c* of any token buckets it possesses. Note that when the deep packet inspection engine 108*a* receives the token buckets 140*a-c*, it may store a local copy of their states as local token bucket state 182. The deep packet inspection engine 108*a* may update the local state 182 during performance of the methods 220 and 250 shown in FIGS. 2B and 2C, and then transmit the updated state 182 in message 160*a* to deep packet inspection engine 108*b*.

If the deep packet inspection engine 108*a* does not currently own a token bucket associated with the currently-dequeued packet 176, the engine 108*a* may wait until it obtains such a token bucket. Otherwise, if the deep packet inspection engine 108*a* does currently own a token bucket associated with the currently-dequeued packet 176, then the deep packet inspection engine 108*a* determines whether the token bucket contains enough tokens to transmit the packet 176 (step 258). Recall that tokens have size 152. Therefore the determination of whether a token bucket contains enough tokens to transmit the packet 176 may be made by comparing the size of the packet 176 to the number of tokens in the token bucket multiplied by the token size 152.

If the rate limiter does not have a sufficient number of tokens to transmit the packet 176, then the packet 176 is not transmitted (step 260). The packet 176 may, for example, be dropped. As another example, the packet 176 may be re-queued onto the output queue 174, so that another attempt may be made to transmit the packet 176 at a future time. Examples of techniques that may be used to requeue the packet are described, for example, in U.S. patent application Ser. No. 11/745,307, filed by Brian C. Smith and Gerald S. Stellenberg on May 7, 2007, entitled "Method and System for Controlled Delay of Packet Processing with Multiple Loop Paths".

If the token bucket includes sufficient tokens to transmit the packet 176, then the deep packet inspection engine 108a transmits the packet 176 over the network 114 (step 262) and removes the number of tokens corresponding to the packet size from the token bucket associated with the packet 176 (step 264). The deep packet inspection engine 108a may, for example, remove packets from the token bucket by updating the local state 182. Note that if transmission of the packet 176 causes the token bucket to become empty, the deep packet inspection engine 108a may transfer ownership of the token bucket to another one of the deep packet inspection engines 108a-d, as described above with respect to step 236 of FIG. 2B.

The method 250 loops back to step 252 after performing step 256, 260, or 264, to dequeue the next packet from the output queue 174. In this way, the deep packet inspection engine 108a continues to process packets from its output queue 174 in accordance with the floating token bucket scheme disclosed herein.

As mentioned above, using one of the deep packet inspection engines 108a-d as a "token master" is merely one example of a mechanism that may be used to manage the rate limiters 120a-c and associated token buckets 140a-c. As another example, the state of the rate limiters 120a-c and token buckets 140a-c may be stored as shared state, which may be managed by a shared stated management mechanism. This shared state management mechanism may keep track of the current owner(s) of the token buckets and pass ownership of the token buckets from one deep packet inspection engine to another by, for example, transmitting messages to the deep packet inspection engines 108a-d to inform them of changes in ownership. The shared state management mechanism may perform functions described above, such as refilling token buckets, removing tokens from token buckets when packets are transmitted, enforcing the maximum long-term average data rates 126a-c and maximum burst rates 124a-c, and enforcing the maximum bucket holding period 152.

As yet another example, one of the deep packet inspection engines may again be designated as a token master. Instead of passing the token buckets from one deep packet inspection engine to another, however, a deep packet inspection engine in need of tokens to transmit a particular number of packets of a particular traffic class may send a message to the token master requesting those tokens. In response, the token master may respond with a message either containing the requested tokens or denying the request.

These are merely examples of ways in which a floating token bucket scheme may be implemented in accordance with the techniques disclosed herein. Those having ordinary skill in the art will appreciate that such techniques may be implemented in other ways.

One advantage of techniques disclosed above is that they may be used to limit data transfer rates of different classes of traffic to predetermined maximum data rates associated with those classes of traffic. More specifically, over time, the output data rate for each class of traffic will either match the input data rate, or match the maximum data rate associated with that class' rate limiter, whichever is smaller. These techniques achieve this result even when the traffic is distributed across multiple deep packet inspection engines. Therefore, the techniques disclosed herein provide the benefits of rate limiting to systems in which traffic is distributed, such as through load balancing, among multiple processors.

The techniques disclosed herein in conjunction with FIGS. 1B and 1C provide this benefit with a minimal amount of processing, and without requiring time-consuming or complex message passing among the deep packet inspection engines 108a-d. In particular, the techniques disclosed herein may be implemented using a relatively small amount of shared state (such as the states of the rate limiters 120a-c shown in FIG. 1B). The use of shared "floating" token buckets enables the IPS 100 is a simple yet effective way of communicating state among the processors 108a-d without requiring messages to be passed between pairs of the processors 108a-d. As a result, the techniques disclosed herein may be implemented in a small, low-cost, high-availability system.

One advantage of embodiments of the present invention which share token buckets by passing messages among the deep packet inspection engines 108a-d is that they avoid problems that may result from implementing the rate limiters 120a-d using shared data structures, such as contention and synchronization for access to such data structures. Furthermore, passing token buckets from one deep packet inspection engine to another, using individual messages between successive engines avoids problems often found in schemes requiring sending messages to multiple engines at the same time. In particular, the techniques disclosed herein scale easily because only a single message need be delivered for each token bucket transfer regardless of the total number of deep packet inspection engines in the token bucket chain.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

For example, various techniques disclosed herein as being performed by the deep packet inspection engines 108a-d may alternatively be implemented by the load balancer 104. Similarly, the state stored in the rate limiters 120a-c may, for example, alternatively be stored within the load balancer 104 or other component(s) of the IPS 100.

The deep packet inspection engines 108a-d may be implemented on a single chip. For example, in one embodiment of the present invention, 32 deep packet inspection engines are implemented on a first chip and 32 additional deep packet inspection engines are implemented on a second chip. The techniques disclosed herein may be applied to all 64 such deep packet inspection engines. For example, the rate limiters 120a-c may be shared among all such 64 deep packet inspection engines.

Although the deep packet inspection engine 108a is illustrated in FIG. 1C as having a single output queue 174, this is not a limitation of the present invention. For example, the deep packet inspection engine 108a (and the other deep packet inspection engines 108*b-d*) may have a plurality of output queues, each of which corresponds to a different one of the rate limiters 120*a-c*. In a particular deep packet inspection engine, the output queue corresponding to a particular rate limiter may be processed only when that deep packet inspection engine owns that rate limiter. Outgoing packets may accumulate in the other output queues until the deep packet inspection engine acquires ownership of their respective rate limiters.

Deep packet inspection may be performed on packets either before or after rate limiting is applied to those packets. If deep packet inspection is performed after rate limiting, then if a packet is dropped as a result of rate limiting, then deep packet inspection need not be applied to that packet. One advantage of performing deep packet inspection to packets after applying rate limiting to them, therefore, is that deep packet inspection may be applied only to those packets for which it is needed, thereby conserving the resources used by deep packet inspection.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A system comprising:
    a plurality of first rate limiters associated with a first maximum processing rate associated with a first traffic flow of a first traffic class;
    a plurality of packet processors to process the first traffic flow, wherein each of the plurality of packet processors comprises one of the plurality of first rate limiters; and
    wherein the plurality of first rate limiters are to limit a first aggregate rate of processing of the first traffic flow among the plurality of packet processors to the first maximum processing rate through communication of messages between the plurality of first rate limiters in the plurality of packet processors, wherein the plurality of first rate limiters comprise a floating token bucket associated with the plurality of first rate limiters, wherein the plurality of packet processors are to limit processing of the first traffic flow based upon tokens contained in the floating token bucket, wherein the floating token bucket is to be passed among the plurality of packet processors, wherein the plurality of packet processors are to process the traffic flow in response to the floating token bucket including at least one token, and wherein the plurality of packet processors are to remove a number of tokens from the floating token bucket corresponding to the amount of traffic to be transmitted by the plurality of packet processors.

2. The system of claim 1, wherein the plurality of packet processors are further to process a second traffic flow, and wherein the system further comprises:
    a plurality of second rate limiters associated with a second maximum processing rate for the second traffic flow, wherein each of the plurality of packet processors comprises one of the plurality of second rate limiters; and
    wherein the plurality of second rate limiters are to limit a second aggregate rate of processing of the second traffic flow among the plurality of packet processors to the second maximum processing rate.

3. The system of claim 1, wherein the first traffic flow is one of a first plurality of traffic flows of the first traffic class;
    wherein the plurality of packet processors are to process the first plurality of traffic flows; and
    wherein the plurality of first rate limiters are to limit a first aggregate rate of processing of the first plurality of traffic flows by the plurality of packet processors to the first maximum processing rate.

4. The system of claim 1, wherein the plurality of packet processors comprises a first plurality of deep packet inspection engines to perform deep packet inspection on the first traffic flow.

5. A system comprising:
    a plurality of first rate limiters associated with a first maximum processing rate associated with a first traffic flow of a first traffic class;
    a plurality of packet processors to process the first traffic flow, wherein each of the plurality of packet processors comprises one of the plurality of first rate limiters; and
    wherein the first rate limiters are to limit a first aggregate rate of processing of the first traffic flow among the plurality of packet processors to the first maximum processing rate through communication of messages between the plurality of first rate limiters in the plurality of packet processors, wherein the plurality of first rate limiters comprises:

a token bucket associated with the first traffic class, the token bucket being associated with a current number of tokens, a refill rate, and a maximum number of tokens;
means for refilling the token bucket with tokens at the refill rate;
means for limiting the current number of tokens to the maximum number of tokens;
means for allocating the token bucket to a first one of the plurality of packet processors;
means for prohibiting the first one of the plurality of packet processors from processing a first amount of traffic corresponding to more than the current number of tokens in the token bucket; and
means for removing a first number of tokens from the token bucket proportional to the first amount of traffic processed by the first one of the plurality of packet processors.

6. The system of claim 5, further comprising:
means for allocating the token bucket to a second one of the plurality of packet processors;
means for prohibiting the second one of the plurality of packet processors from processing a second amount of traffic corresponding to more than the current number of tokens in the token bucket; and
means for removing a second number of tokens from the token bucket proportional to the second amount of traffic processed by the second one of the plurality of packet processors.

7. A computer-implemented method for use with a system, the method comprising:
(A) associating a first maximum processing rate with a plurality of first rate limiters, wherein the first maximum processing rate is further associated with a first traffic flow of a first traffic class;
(B) using a plurality of packet processors to process the first traffic flow, wherein each of the plurality of packet processors comprises one of the plurality of first rate limiters; and
(C) limiting a first aggregate rate of processing of the first traffic flow among the plurality of packet processors to the first maximum processing rate through use of a floating token bucket associated with the plurality of first rate limiters, wherein the plurality of packet processors are to limit processing of the first traffic flow based upon tokens contained in the floating token bucket;
(D) passing the floating token bucket among the plurality of packet processors;
and wherein (B) further comprises using the plurality of packet processors to process the traffic flow in response to the floating token bucket including at least one token, and removing a number of tokens from the floating token bucket corresponding to the amount of traffic to be transmitted by the plurality of packet processors.

8. The method of claim 7, wherein (B) further comprises using the plurality of packet processors to process a second traffic flow, and wherein the method further comprises:
(E) associating a second maximum processing rate for the second traffic flow with a plurality of second rate limiters, wherein each of the plurality of packet processors comprises one of the plurality of second rate limiters; and
(F) limiting a second aggregate rate of processing of the second traffic flow among the plurality of packet processors to the second maximum processing rate.

9. The method of claim 7, wherein the first traffic flow is one of a first plurality of traffic flows of the first traffic class;
wherein (B) comprises processing the first plurality of traffic flows; and
wherein (C) comprises limiting a first aggregate rate of processing of the first plurality of traffic flows by the plurality of packet processors to the first maximum processing rate.

10. The method of claim 7, wherein the first plurality of packet processors comprises a first plurality of deep packet inspection engines, and wherein (B) comprises using the first plurality of deep packet inspection engines to perform deep packet inspection on the first traffic flow.

11. A computer-implemented method for use with a system, wherein the system comprises a token bucket associated with the first traffic class, the token bucket being associated with a current number of tokens, a refill rate, and a maximum number of tokens, the method comprising:
(A) associating a first maximum processing rate with a plurality of first rate limiters, wherein the first maximum processing rate is further associated with a first traffic flow of a first traffic class;
(B) using a plurality of packet processors to process the first traffic flow, wherein each of the plurality of packet processors comprises one of the plurality of first rate limiters; and
(C) limiting a first aggregate rate of processing of the first traffic flow among the plurality of packet processors to the first maximum processing rate by:
(C) (1) refilling the token bucket with tokens at the refill rate;
(C) (2) limiting the current number of tokens to the maximum number of tokens;
(C) (3) allocating the token bucket to a first one of the plurality of packet processors;
(C) (4) prohibiting the first one of the plurality of packet processors from processing a first amount of traffic corresponding to more than the current number of tokens in the token bucket; and
(C) (5) removing a first number of tokens from the token bucket proportional to the first amount of traffic processed by the first one of the plurality of packet processors.

12. The method of claim 11, further comprising:
(D) allocating the token bucket to a second one of the plurality of packet processors;
(E) prohibiting the second one of the plurality of packet processors from processing a second amount of traffic corresponding to more than the current number of tokens in the token bucket; and
(F) removing a second number of tokens from the token bucket proportional to the second amount of traffic processed by the second one of the plurality of packet processors.

13. The system of claim 1, wherein the plurality of packet processors are to pass the floating token bucket among each other in a round-robin fashion.

14. The method of claim 7, wherein passing the floating token bucket among the plurality of packet processors further comprises passing the floating token bucket among the plurality of packet processors in a round-robin fashion.

* * * * *